United States Patent
Hammerschmidt

(10) Patent No.: US 10,704,988 B2
(45) Date of Patent: Jul. 7, 2020

(54) SENSOR SYSTEMS AND METHODS HAVING EMULATED LINE ADAPTATION

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 2140 days.

(21) Appl. No.: 13/779,900

(22) Filed: Feb. 28, 2013

(65) Prior Publication Data
US 2014/0244206 A1    Aug. 28, 2014

(51) Int. Cl.
*H04L 25/02* (2006.01)
*G01M 15/02* (2006.01)

(52) U.S. Cl.
CPC ......... *G01M 15/02* (2013.01); *H04L 25/0278* (2013.01)

(58) Field of Classification Search
CPC ..... G01M 15/02; H04L 25/0278; H04L 25/12
See application file for complete search history.

(56) References Cited

U.S. PATENT DOCUMENTS

| | | | |
|---|---|---|---|
| 6,910,381 B2 | 6/2005 | Albert et al. | |
| 8,290,688 B2 | 10/2012 | Watson | |
| 2005/0116745 A1* | 6/2005 | Huang | H04L 25/0278 327/108 |
| 2007/0041512 A1* | 2/2007 | Pickerd | G01R 35/005 379/30 |
| 2007/0195895 A1* | 8/2007 | Siebert | H04L 25/0272 375/244 |
| 2010/0268109 A1* | 10/2010 | Wang | A61B 5/0536 600/547 |
| 2011/0124303 A1* | 5/2011 | Huot | B60C 23/0433 455/115.4 |
| 2012/0119568 A1* | 5/2012 | Orion | H04B 3/548 307/3 |
| 2012/0277976 A1 | 11/2012 | Skoff | |

FOREIGN PATENT DOCUMENTS

WO    WO-2008007330 A2 *    1/2008    ............... H03H 7/40

OTHER PUBLICATIONS

Learning ABout Electronics "Filter Capacitor—Explained," Nov. 2012 [retrieved on Dec. 24, 2016]. Retrieved from the Internet< URL: https://web.archive.org/web/20121114213456/http://www.learningaboutelectronics.com/Articles/Filter-capacitor.php>.*

* cited by examiner

*Primary Examiner* — Alexander Satanovsky
*Assistant Examiner* — Liam R Casey
(74) *Attorney, Agent, or Firm* — Eschweiler & Potashnik, LLC

(57) ABSTRACT

A measurement system includes a signal bus, an electronic control unit, and an emulated sensor. The electronic control unit is coupled to the signal bus. The sensor with emulated line adaptation is also coupled to the signal bus. The emulated sensor is configured to adapt current consumption according to a selected impedance and a selected frequency range.

21 Claims, 7 Drawing Sheets

SENSOR SYSTEMS AND METHODS HAVING EMULATED LINE ADAPTATION

BACKGROUND

Automotive systems are complex systems that include computers and components to operate and monitor operation automotive vehicles. The systems typically include a processor that controls and monitors engine operation and the like. The system generally operates various control systems that perform automotive functions. By monitoring, minor problems can be identified and corrected before becoming major problems.

A typical sensor system that can be utilized in automotive systems includes the processor, electronic control unit (ECU), signal lines, and sensors. The various elements need to communicate with each other via the signal lines. However, variations in the signal lines and components can cause challenges.

DETAILED DESCRIPTION

Figure 1:
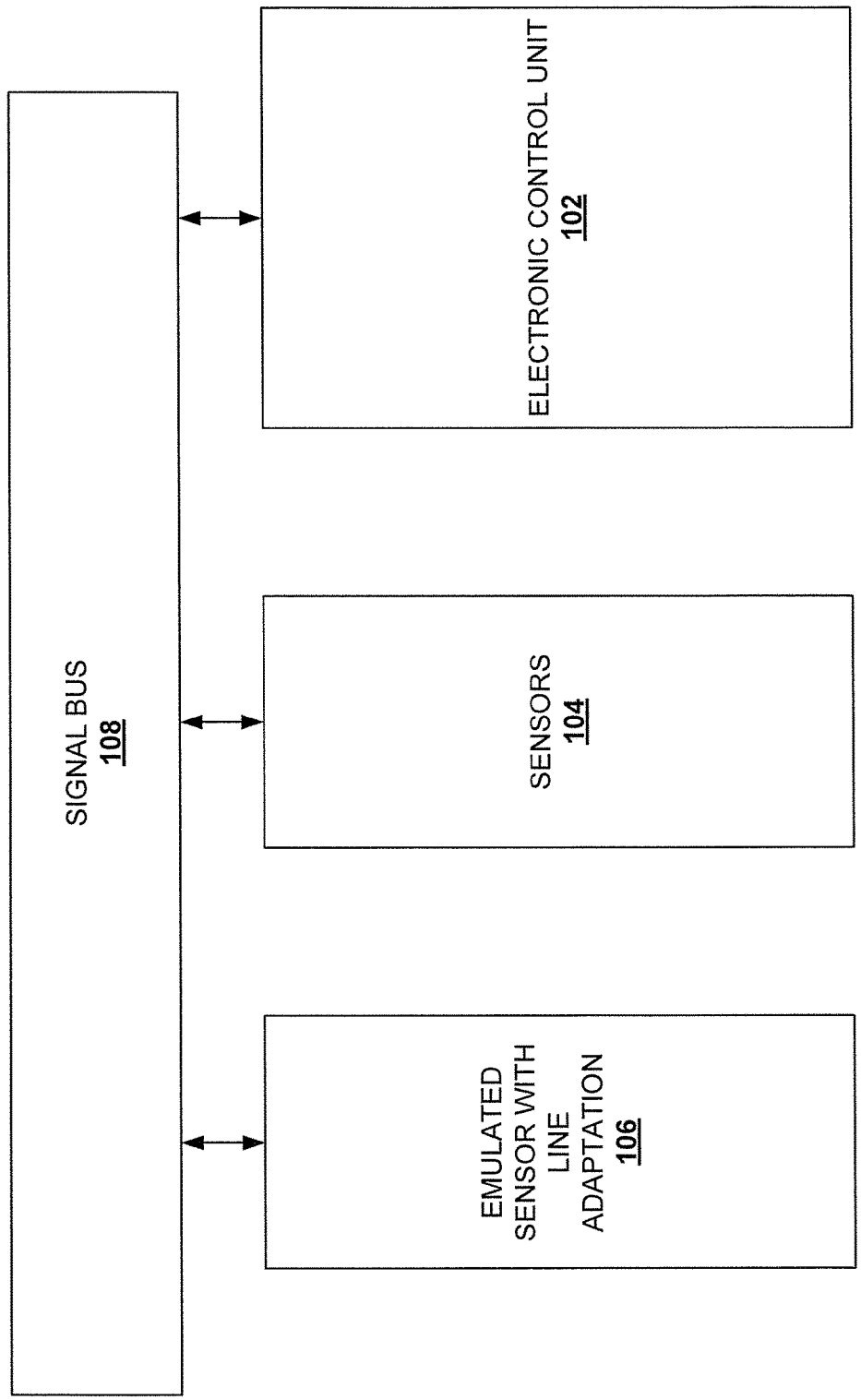
FIG. 1 is a block diagram of automotive control and measurement system having an emulated sensor with line adaptation.

The present invention will now be described with reference to the attached drawing figures, wherein like reference numerals are used to refer to like elements throughout, and wherein the illustrated structures and devices are not necessarily drawn to scale.

Systems and methods are disclosed that facilitate sensor systems. The systems and methods include sensors having emulated line adaptation. The sensors can be utilized, for example, in measurement and analysis systems, such as automotive analysis and sensor systems.

FIG. 1 is a block diagram of automotive control and measurement system 100 having a sensor with emulated line adaptation. The system 100 is provided in a simplified format in order to facilitate understanding. It is appreciated that components and the like are omitted.

The system 100 includes an electronic control unit (ECU) 102, sensors 104 without line adaptation, a sensor with emulated line adaptation 106 and signal lines/bus 108. The ECU 102 is a system that controls and or monitors an electrical system in a motor vehicle. The ECU 102 can be assigned to particular functions and/or systems of the vehicle, for example, power train control, engine control, brake control, airbags and the like. The ECU 102 generates and receives a variety of signals including measurement signals and control signals.

The signal bus 108 includes a plurality of signal lines that convey information between the ECU 102 and other components of the system 100. The other components include controllable components, monitored components, and include sensors 104. The signal bus 108 permits communication between the various components over the plurality of signal lines or wires connected there between.

The sensors 104 measure and/or obtain measurements of various characteristics. The characteristics may include, for example, vibration measurements, chemical measurements, temperature measurements, flow measurements, navigation information, position information, pressure information, temperature, and the like. The sensors 104 may include a variety of sensors, for example, temperature sensors, coolant level sensors, hall effect sensors, crankshaft position sensors, gas pedal position sensors, accelerometers, pressure sensors, and the like.

The ECU 102 provides the control signals according to control algorithms based on the measurement signals. The control signals include control information for various control systems for the motor vehicle. The control systems can include, for example, a speed control unit, an airbag control unit, a transmission control unit, a powertrain control unit and the like.

The control signals can be based on one or more of the measurement signals. For example, an engine control signal can be determined based on a torque measurement, temperature, angle of gas pedal and the like. The engine control signal, in one example, includes how much gas to inject at a particular time and to a selected cylinder.

The measurement signals also provide feedback to the ECU 102 on the impact or resulting behavior of the generated control signals. For example, an engine control signal could correspond to selected speed of 60 mph, but could result in a measured speed of 55 mph. This could indicate an error or adjustment needed in the control algorithm used to generate the signal or that some other factor is impacting the resulting speed.

The sensors 104 are typically located external to the ECU 102. The distance between various sensors and the ECU 102 can vary substantially. Wiring is costly in terms of weight and expense, particularly for automotive systems. Thus, the signal bus 108, which connects the sensors 104 with the ECU, typically uses only two signal lines or wires to convey power and transmit signals. The signals are transmitted by using an appropriate modulation interface so that power can be supplied to the sensor while information is transferred. Some examples of suitable interfaces include the peripheral sensor interface (PSI) standard version 5 and the digital sensor interface (DSI) standard, which are utilized for automotive airbag and powertrain systems.

Variations in the lengths and paths between the sensors 104 and the ECU lead to variations in inductance and capacitance. These variations can degrade signals, slow communication, or even lead to unwanted resonance signals.

An RC filter may be included to mitigate the unwanted resonance signals. The filter, in one example, can be placed between the sensors 104 and wires of the bus 108 connecting the sensors 104 to the ECU 102. Such a filter dampens the resonance between a line inductance and capacitors for the sensors 104 and the ECU 102. Additionally, the filter can attenuate injected EMC.

However, using an RC filter is insufficient to match the impedance of the ECU 102 to the bus wires 108. For example, common lines utilized for the signal bus 108 include a twisted pair of wires having a line impedance of 120 Ohm. In one example, the ECU 102 is required to deliver 6 to 15 V with up to 70 mA. At such power levels, a 120 Ohm termination is unacceptable due to the excessive power consumption and a voltage drop across the resistor which exceeds the available supply voltage (70 mA*120 Ohm>6V).

For the sensors 104, an RC filter can be used because the sensors 104 typically include 50 Ohm resistors and 5-10 nF capacitors and provide an acceptable line termination in a selected frequency range of interest, such as 100 kHz and 5 MHz.

The sensor with emulated line adaptation 106 is utilized in addition to or in place of an RC filter. The sensor with emulated line adaptation 106 adapts line impedance to an acceptable level for the selected frequency range of interest. The sensor with emulated line adaptation 106 does not utilize additional discrete components.

The sensor with emulated line adaptation 106 is coupled to the signal bus 106 and measures a variation on the signal bus 108. The measured variation is used to determine an impedance adaptation amount to yield a selected line termination for the selected frequency range. The impedance adaptation is then implemented by the sensor with emulated line adaptation 106 using a current source or other suitable mechanism. The acceptable line termination is obtained by the impedance adaptation.

It is noted that the impedance adaptation is only needed for the selected frequency range. Thus, signals on the signal bus 106 outside the selected frequency range do not require measurement of the variation of the bus voltage and/or the impedance adaptation.

Figure 2:
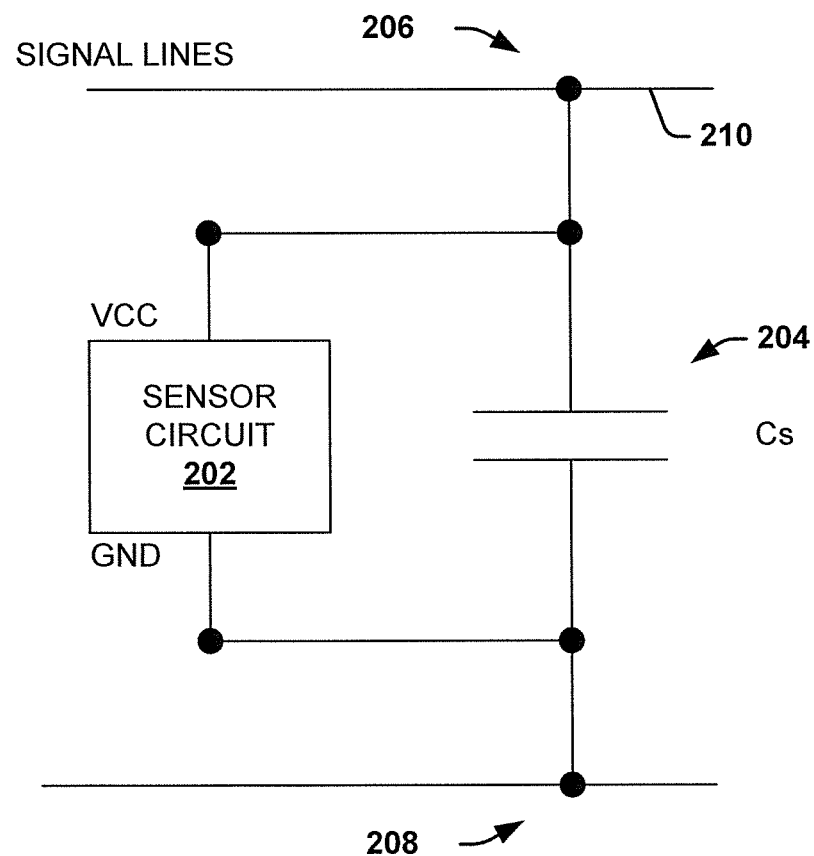
FIG. 2 is a diagram illustrating an example sensor that can be utilized in a control and measurement system.

FIG. 2 is a diagram illustrating an example sensor 200 that can be utilized in a control and measurement system. The sensor 200 is provided in a simplified format in order to facilitate understanding.

The sensor 200 is connected to the control and measurement system via a signal bus 210, which includes two signal lines. An upper line is at a varied potential and a lower line is often at about ground, but can be on another varied potential as well.

The sensor includes an upper node 210, a lower node 208, a sensor capacitor 204, and a sensor circuit 202. The upper node 210 is connected to the upper line of the signal bus 210. The upper line is also referred to as a PDL line. The lower node 208 is connected to the lower line of the signal bus 210. The capacitor 204 and the circuit 202 are connected in parallel with common connections to the upper node 210 and the lower node 208. The circuit 202 provides a modulated current, which can be received via an ECU or other component of the control and measurement system.

The circuit 202 typically has relatively high impedance, such as greater than 1 k ohm. This high impedance limits variations of the current consumption, in one example to less than 1 mA caused by a 1V change of the supply voltage. However, such sensors can have a significant amount of capacitance per sensor that are charged and/or discharged each time the ECU sends a synchronization pulse or a message using a modulation of the supply voltage.

Figure 3:
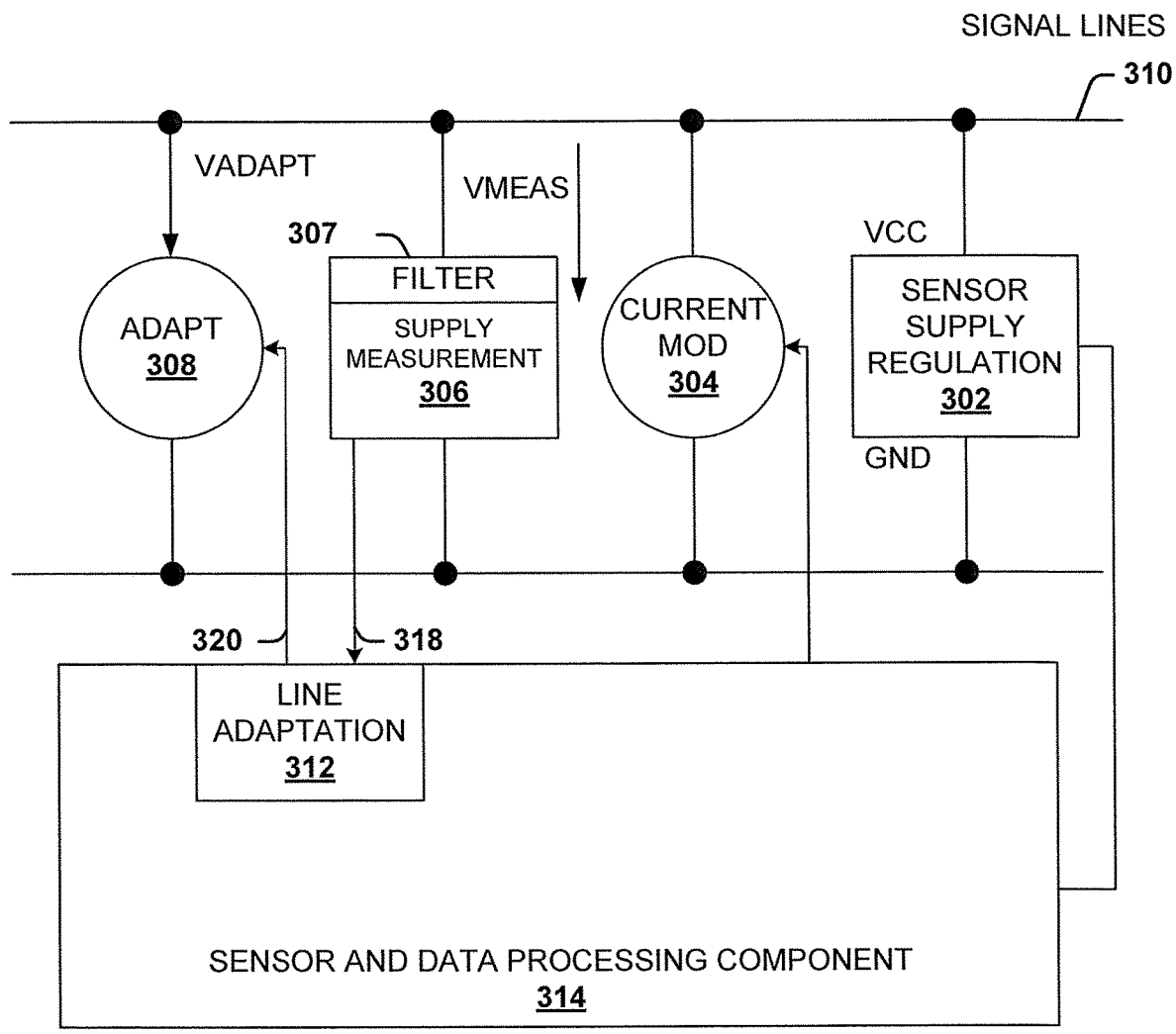
FIG. 3 is a diagram illustrating an emulated sensor providing impedance adaptation.

FIG. 3 is a diagram illustrating a sensor with emulated line adaptation 300 providing impedance adaptation. The sensor 300 is provided in a simplified form in order to facilitate understanding.

The sensor 300 includes a sensor supply 302, a current modulation component 304, a supply measure component 306, an adaptation component 308, and a sensor and data processing component 314. The sensor 300 is connected to signal lines 310, which connect the sensor to other components, such as an ECU. The sensor and data processing component 314 includes a line adaptation component 312.

The supply measure component 306 is a mechanism to measure the supply voltage and obtain a supply or signal measurement 318. In one example, the measure component includes an analog to digital converter (ADC). The component provides a signal measurement 318 of the supply voltage to the line adaptation component 312. The signal measurement 318 is also referred to as an offset and represents a change in voltage or current within a known frequency band that requires line adaptation. The supply measurement component may measure the complete supply voltage including the DC component but it may also include a highpass or bandpass filter 307 to limit the input range for the measurement range to the amplitudes of spectral components that can appear in the frequency range of the signals and the line resonances.

The line adaptation component 312 is a processing block that determines an impedance adaptation amount 320 according to the supply measurement 318. In one example, the line adaptation component 312 is implemented using a digital signal processor. In another example, the line adaptation component 312 is implemented using analog components, such as a bandpass filter that filters the measured supply voltage and adjusts a control voltage of the adaptation component 308.

The impedance adaptation amount 320 is then provided to the adaptation component 308. In one example, the adaptation amount 320 is supplied to the component 308 in the form of a digital signal and in another example it is supplied in the form of a control voltage.

The adaptation component 308 adapts line impedance according to the impedance adaptation amount 320. In one example, the adaptation component 308 provides an offset current to yield the impedance adaptation amount.

The sensor and data processing component 314 includes the line adaption component 312 and may include other components (not shown). The sensor component 314 obtains measurements and provides the information in the form of signals. The signals are provided by modulating current via the current modulation component 304.

In order to facilitate understanding, an example is provided showing how the sensor with emulated line adaptation 300 can account for a large spread of capacitances and impedances. However, it is appreciated that the sensor 300 and variations are contemplated beyond the example presented.

The PSI5 standard species a range of line inductance, denoted as $L_L$, an ECU capacitance range, denoted as $C_E$, and a cumulative sensor capacitance, denoted as $C_S$. The line inductance ($L_L$) ranges from 0 to 8.7 micro H. The ECU capacitance range ($C_E$) ranges from 5 to 35 nF. The sensor capacitance ($C_S$) can range from 5 to 107 nF. Consequently, a resonance frequency of a load network can be close to or even inside a frequency band specified for data transmission.

Thus, adaption of the line impedance for only the specified frequency band limits the resonance and improves the reliability of a signal bus. Further, it is possible to shift the lowest resonance frequencies significantly upwards by decreasing sensor capacitors, which leads to an increase of achievable channel capacity.

For this example, $L_L$=0 micro H to 8.7 micro H, $C_E$=5 to 35 nF, and $C_S$=5 nF to 107 nF. Using these values, a typical sensor can transmit data by Manchester encoded current modulation with a data rate of 125 to 189 Bit/s.

A first resonance is a serial resonance mode caused by a serial connection of a sensor capacitor and signal line inductances. The zeros, denoted by Zres1 and Zres2, are given by:

$$z_{res1} = j \times \sqrt{\frac{1}{C_S * L_L}}$$

$$z_{res2} = -j \times \sqrt{\frac{1}{C_S * L_L}}$$

A second resonance is a parallel resonance caused by a parallel connection of the line inductance with the serial connection of an ECU capacitor $C_E$ and a plurality of sensors. Its poles, denoted by Pres1 and Pres2, are given by:

$$P_{res1} = j \times \sqrt{\frac{C_E + C_S}{C_S * L_L * C_E}}$$

$$P_{res2} = -j \times \sqrt{\frac{C_E + C_S}{C_S * L_L * C_E}}$$

Thus, a decrease of the maximum for sensor capacitive load achieves a target to increase all resonance frequencies. In order to influence the quality factor of the different resonance modes, emulation of a serial resistor can be provided.

It is appreciated that other components can be utilized with the sensor 300 and/or with a control and/or measurement system in which the sensor is utilized. The other components include filters and the like.

Figure 4:
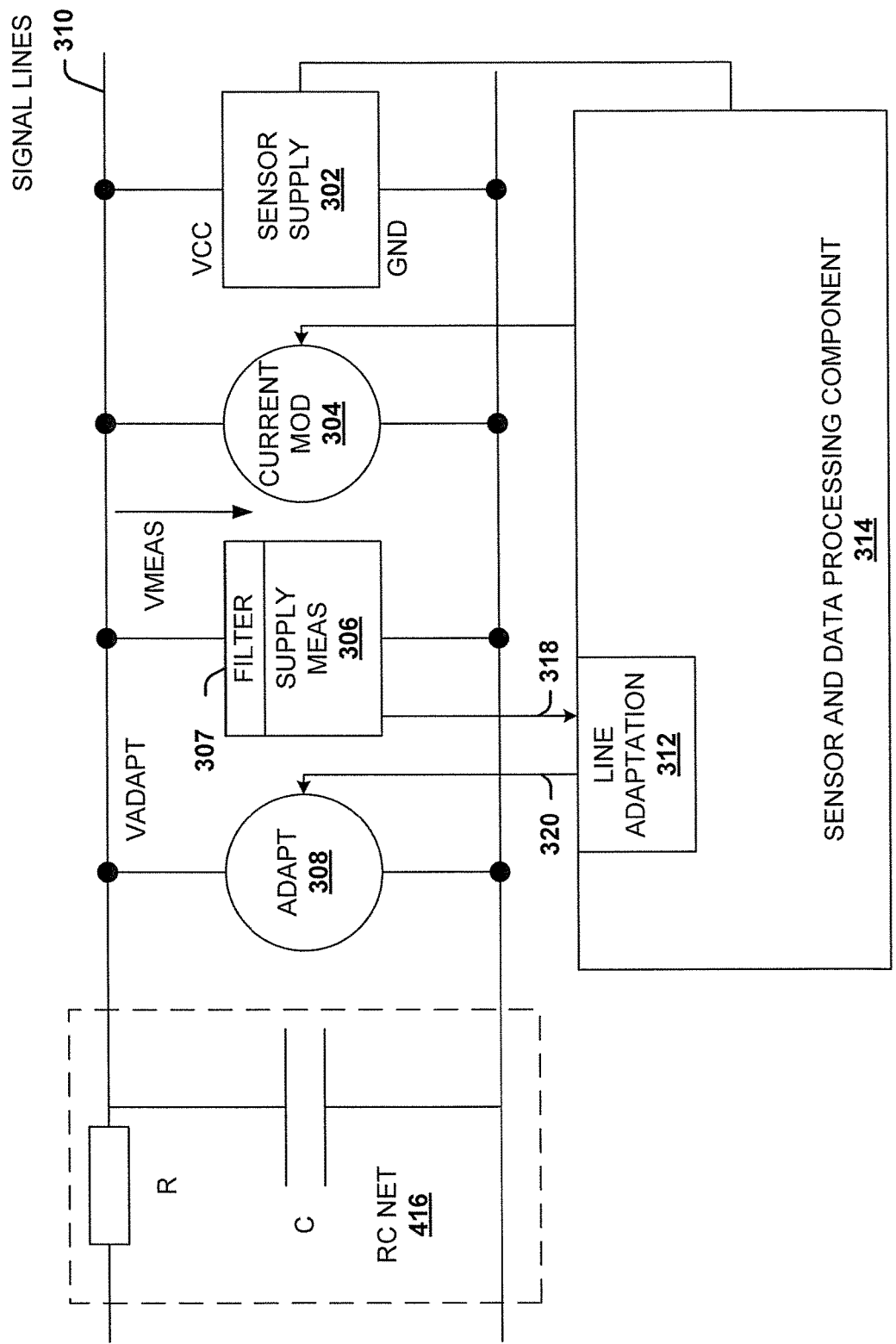
FIG. 4 is a diagram illustrating an emulated sensor incorporating a filter at a front end of the sensor.

FIG. 4 is a diagram illustrating a sensor with emulated line adaptation 400 incorporating a filter at a front end of the sensor 400. The sensor 400 is provided in a simplified form in order to facilitate understanding.

The sensor 400 is substantially similar to the sensor 300 described above. For a description of the similarly named components, reference the above description.

To facilitate line adaptation, the sensor 400 includes an emulated sensor filter 416. The filter 416 filters the supply voltage prior to being measured by the supply measure component 306. The supply voltage is filtered to remove DC components since it is not required to increased current consumption of the sensor 400, which would only contribute to power consumption and not impact resonance effects on the signal bus 310.

The filter 416 may also include a more complex transfer function in order to equalize the measured supply and, for example, allow setting a different impedance in the frequency range of the communication signals and higher frequencies which are only relevant for the resonance and EMC distortions.

Instead of measuring the supply voltage, the supple measure component 306 obtains a filtered supply voltage measurement, which is then used by the line adaptation component 312. In this case the RC filter has to be taken into account in the adjustment of the emulated impedance (Vmeasure/ladapt). The emulated impedance is now in parallel with the capacitor and this parallel connection is in serial with the resistor. And the overall network of the 2 real and 1 emulated elements has to be adapted to the line.

Figure 5:
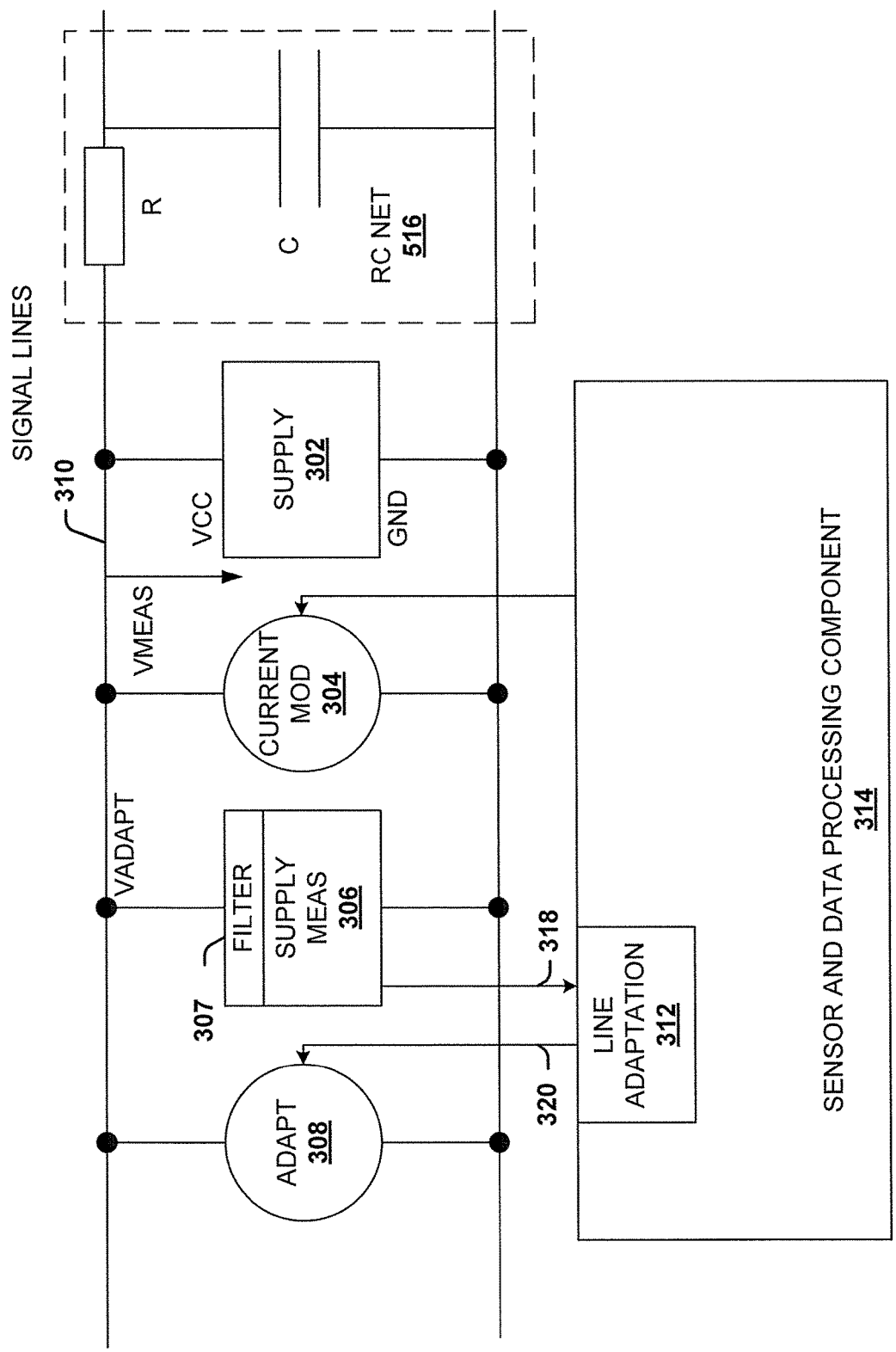
FIG. 5 is a diagram illustrating an emulated sensor incorporating a filter at a back end of the sensor.

FIG. 5 is a diagram illustrating an emulated sensor 500 incorporating a filter at a back end of the sensor 500. The sensor 500 is provided in a simplified form in order to facilitate understanding.

The sensor 500 is similar to the sensor 300 and the sensor 400 described above. For a description of the similarly named components, reference the above description.

To facilitate line adaptation, the sensor 500 includes an emulated sensor filter 516. The filter 516 is connected to the signal bus 310 and filters the supply voltage prior to being measured by the supply measure component 306. The supply voltage is filtered to remove DC components since it is not required to increased current consumption of the sensor 500, which would only contribute to power consumption and not impact resonance effects on the signal bus 310.

Again, the filter 516 may also include a more complex transfer function and, for example, allow setting a different impedance in the frequency range of the communication signals and higher frequencies, which are only relevant for the resonance and EMC distortions.

The supply measurement directly measures the supply voltage in this case. But the additional RC network has again to be taken into account when calculation the target transfer function for the emulated impedance.

It is appreciated that filtering can also be moved behind the adaptation calculation.

Figure 6:
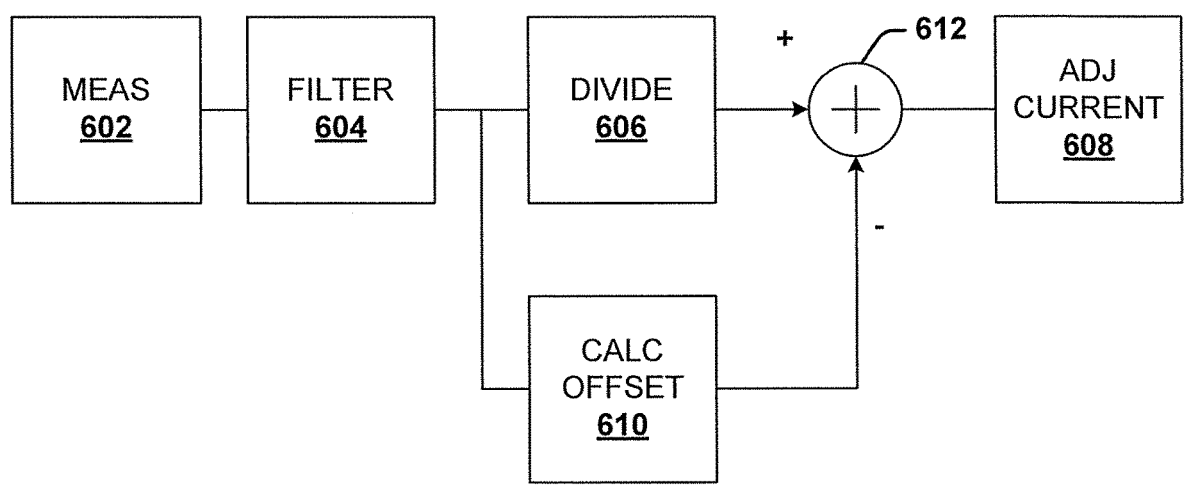
FIG. 6 is a diagram illustrating a method for generation of an adaptation current wherein filtering occurs prior to calculating an adjustment current.

FIG. 6 is a diagram illustrating a method 600 for generation of an adaptation current wherein filtering occurs prior to calculating an adjustment current.

The method 600 begins at block 602, where a supply voltage is measured. In this example, the supply voltage has not been filtered and may include DC components.

The signal measurement is filtered at block 604 to remove DC components from the measurement. It is noted that block 604 may not be required for the case where a analog highpass or bandpass input filter already filters the supply voltage.

The signal measurement is divided by an intended or selected impedance at block 606 to yield a divided amount. An offset adjustment amount is calculated from the signal measurement at block 610. The offset adjustment current represents the current bypassing the chip e.g. via the RC networks 416 or 516.

The adjustment amount from block 610 is subtracted from the divided amount at 612 using an adder to yield a total adjustment amount. The total adjustment amount is used at block 608 to create an adjustment current to yield a selected termination amount.

It is appreciated that other suitable variations are contemplated. For example, the filter block 604 can be performed after generation of the total adjustment amount. In another example, the filter is omitted. In yet another example, another block replaces the filter block and corrects for a voltage drop/offset using a serial resistor as used in network 416. In another example the filter 604, the divider 606 and the offset calculation are combined to a single filter that calculates an impedance function, which is required to form the required impedance transfer function. If external components are part of the sensor like the RC networks 416 or 516, their influence is taken into account in this filter.

Figure 7:
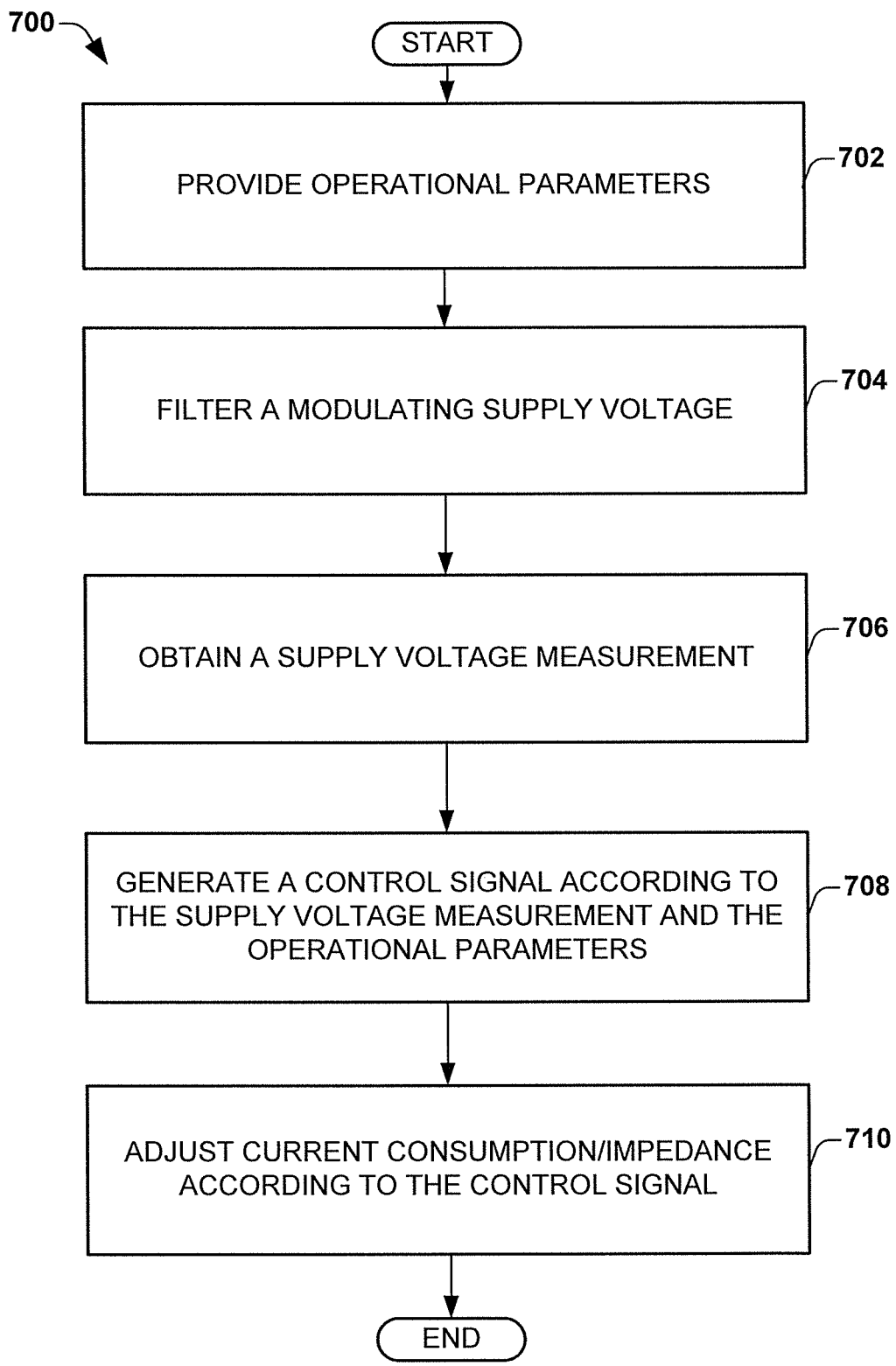
FIG. 7 is a flow diagram illustrating a method of operating a control and measurement system.

FIG. 7 is a flow diagram illustrating a method 700 of operating a control and measurement system. The method 700 adapts characteristics of a signal bus by generating an adjustment current in response to a measured supply voltage and a selected impedance.

While method 700 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

The method 700 begins at block 702, where operation parameters for a sensor are provided or obtained. The parameters include a selected impedance and a selected frequency range. In one example, the parameters are specified by an interface standard, such as the DSI standard.

A supply voltage is filtered at block 704. The supply voltage is a time varying signal and can include unwanted DC components and the like. In one example, an RC filter is utilized to remove DC components. In another example, a filter having a transfer function is utilized to remove DC components for the selected frequency range. The transfer function is specific to the selected frequency.

A supply voltage is measured at block 706. A suitable measure mechanism is utilized to obtain the measurement from signal lines or a signal bus. In one example, the measure mechanism includes an analog to digital converter. The supply voltage measurement typically varies due to dynamic processes on the sensor bus influenced by parameters as for example, signal line length, line thickness, other components, capacitance variations, and the like.

A control signal is generated according to the measured supply voltage and the operation parameters at block 708. The measured supply voltage can be highpass or bandpass filtered to determine a dynamic change. The change may be utilized to calculate an adaptation amount to yield the selected impedance. The control signal is generated according to the adaptation amount and is only needed when the measured supply voltage varies within the selected frequency range.

Current consumption for the sensor is adjusted according to the control signal at block 710. In one example, the current consumption is adjusted by utilizing a controllable current source actuated by the control signal. The current adjustment achieves an impedance for the sensor that is closer to an intended or the selected impedance.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown in FIGS. 1, 2, etc., are non-limiting examples of system that may be used to implement method 700). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

A measurement system includes a signal bus, an electronic control unit, and an emulated sensor. The electronic control unit is coupled to the signal bus. The emulated sensor is also coupled to the signal bus. The emulated sensor is configured to adapt current consumption according to a selected impedance and a selected frequency range.

An emulated line sensor includes a supply measure component, a line adaptation component, and an impedance adaptation component. The supply measure component is configured to obtain a supply voltage measurement. The line adaptation component is configured to generate a control signal according to a selected impedance, a selected frequency range, and the obtained supply voltage measurement. The adaptation component is configured to adapt a line impedance according to the control signal.

A method of operating a sensor system is disclosed. A selected impedance and a selected frequency range are provided. A supply voltage is measured. A control signal is generated according to the measured supply voltage, the selected impedance, and the selected frequency range. Current consumption is adjusted according to the control signal.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A measurement system comprising:
a signal bus;
an electronic control circuit coupled to the signal bus; and
at least one sensor with an emulated line adaptation circuit coupled to the signal bus, the emulated line adaptation circuit configured to adapt current consumption associated with the signal bus according to an adaptation amount for a selected impedance and a selected frequency range to provide the selected impedance;
wherein the line adaptation circuit comprises a processing circuit, a supply measurement circuit and an emulated sensor filter circuit, wherein the emulated sensor filter circuit is configured to filter a supply voltage according to the selected impedance and the selected frequency range, the supply measurement circuit is configured to measure the filtered supply voltage and the processing circuit is configured to generate the adaptation amount based on the measured filtered supply voltage.

2. The system of claim 1, wherein the electronic control circuit is configured to receive measurement signals from the at least one sensor.

3. The system of claim 1, further comprising a plurality of sensors coupled to the signal bus and configured to provide measurement signals.

4. The system of claim 3, wherein the sensor with the emulated line adaptation circuit is one of a pressure sensor, an acceleration sensor or a magnetic field sensor.

5. The system of claim 1, wherein the sensor includes an analog to digital converter configured to measure the supply voltage from the signal bus.

6. The system of claim 1, wherein the at least one sensor with emulated line adaptation further includes a current source, wherein the current source is configured to generate an offset current according to the adaptation amount.

7. The system of claim 1, wherein the adaptation amount is provided as a control voltage.

8. The system of claim 1, wherein the adaptation amount is provided as a digital signal.

9. The system of claim 1, further comprising a filter coupled to the signal bus.

10. The system of claim 1, further comprising a filter coupled to the signal bus and configured to remove DC components from the supply voltage.

11. The sensor of claim 10, wherein the adaptation circuit is configured to alter current consumption according to the control signal to yield a line termination for the selected frequency.

12. A sensor with emulated line adaptation comprising:
a supply measure circuit configured to obtain a supply voltage measurement based on an emulated filtered supply voltage;
a line adaptation circuit configured to generate a control signal according to a selected impedance, a selected frequency range, and the supply voltage measurement;
an adaptation circuit configured to adapt a line impedance according to the control signal; and
an emulated sensor filter circuit configured to generate the emulated filtered supply voltage based on the selected frequency and the selected impedance.

13. The sensor of claim 12, wherein the supply measure circuit is configured to obtain the supply voltage measurement from a signal bus.

14. The sensor of claim 12, wherein the line adaptation circuit is configured to divide the supply voltage measurement with the selected impedance to yield a first value.

15. The sensor of claim 14, wherein the line adaptation circuit is configured to calculate bypass currents to yield a second value.

16. The sensor of claim 15, wherein the control signal is based on a combination of the first value and the second value.

17. The sensor of claim 12, wherein the emulated sensor filter circuit is configured to equalize the supply measurement according to a impedance transfer function.

18. A method of operating a sensor system, the method comprising:
setting an emulated sensor filter circuit for a selected impedance and a selected frequency range associated with a signal bus and filtering a supply voltage based on the selected impedance and the selected frequency range;
measuring the filtered supply voltage;
generating a control signal according to the measured supply voltage, the selected impedance and the selected frequency range; and
adjusting current consumption according to the control signal.

19. The method of claim 18, further comprising filtering the supply voltage prior to measuring the supply voltage.

20. The system of claim 1, wherein the emulated sensor filter circuit is configured to set the selected impedance to a first value for a first frequency and to a second value for a second frequency, wherein the second frequency is higher than the first frequency.

21. The system of claim 1, wherein the supply measurement circuit is configured convert the filtered supply into a digital filtered supply and the processing circuit is configured to digitally generate the adaptation amount based on the digital filtered supply.

* * * * *